United States Patent
Umemoto et al.

(10) Patent No.: US 9,159,467 B2
(45) Date of Patent: Oct. 13, 2015

(54) DIELECTRIC CERAMIC COMPOSITION, ELECTRONIC ELEMENT, AND COMPOSITE ELECTRIC ELEMENT

(71) Applicant: TDK Corporation, Minato-ku, Tokyo (JP)

(72) Inventors: Shusaku Umemoto, Tokyo (JP); Takashi Suzuki, Tokyo (JP); Hidekazu Sato, Tokyo (JP); Masaki Takahashi, Tokyo (JP); Shinichi Kondo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/166,479

(22) Filed: Jan. 28, 2014

(65) Prior Publication Data
US 2014/0220364 A1  Aug. 7, 2014

(30) Foreign Application Priority Data

Feb. 6, 2013  (JP) .................................. 2013-021648

(51) Int. Cl.
| | |
|---|---|
| *C03C 8/22* | (2006.01) |
| *C03C 8/14* | (2006.01) |
| *H01B 3/12* | (2006.01) |
| *C03C 14/00* | (2006.01) |

(52) U.S. Cl.
CPC .. *H01B 3/12* (2013.01); *C03C 8/22* (2013.01); *C03C 14/00* (2013.01)

(58) Field of Classification Search
CPC ......................................... C03C 8/22
USPC ..................................... 501/16, 17
See application file for complete search history.

(56) References Cited

U.S. PATENT DOCUMENTS

| | | | | |
|---|---|---|---|---|
| 5,024,975 | A | * | 6/1991 | Hartmann ........................ 501/65 |
| 5,070,046 | A | * | 12/1991 | Hu ..................................... 501/9 |
| 6,008,151 | A |  | 12/1999 | Sasaki et al. |
| 6,348,425 | B1 | * | 2/2002 | Barattini et al. ................. 501/5 |
| 6,444,598 | B1 | * | 9/2002 | Kawakami et al. ............. 501/32 |
| 6,630,417 | B2 | * | 10/2003 | Kawai et al. .................... 501/16 |

FOREIGN PATENT DOCUMENTS

| | | |
|---|---|---|
| CN | 1228068 A | 9/1999 |
| JP | 01-226751 A | 9/1989 |
| JP | 03-141153 A | 6/1991 |

(Continued)

OTHER PUBLICATIONS

Chinese Office Action mailed Feb. 28, 2015 for Chinese Patent Application No. 201410043014.1.

*Primary Examiner* — Noah Wiese
(74) *Attorney, Agent, or Firm* — Arent Fox LLP (57) ABSTRACT

In order to provide a dielectric ceramic composition capable of sintering at a low temperature, implementing a low relative dielectric constant, providing other excellent properties (such as a relative density and an insulation resistance), performing co-firing of different materials, and suppressing dispersion of Ag in the sintered body when the internal electrode is formed, the dielectric ceramic composition includes a main ingredient containing $SiO_2$—$K_2O$—$B_2O_3$-based glass of 40 to 65 weight %, quartz of 35 to 50 weight %, and amorphous silica of remaining weight %; and a subsidiary ingredient containing alumina of 1.5 to 4 weight %, $K_2O$-MO—$SiO_2$—$B_2O_3$-based glass (where "MO" denotes at least any one selected from a group consisting of CaO and SrO) of 5 to 20 weight % relative to the main ingredient of 100 weight %.

7 Claims, 6 Drawing Sheets

(56) References Cited

FOREIGN PATENT DOCUMENTS

| JP | 4-12639 B2 | 3/1992 |
| JP | 09-241068 A | 9/1997 |
| JP | 11-171640 A | 6/1999 |
| WO | 2010/044213 A1 | 4/2010 |

* cited by examiner

DIELECTRIC CERAMIC COMPOSITION, ELECTRONIC ELEMENT, AND COMPOSITE ELECTRIC ELEMENT

CROSS-REFERENCE TO RELATED APPLICATION

This application is based upon and claims the benefit of priority of the Japanese Patent Application No. 2013-021648, filed Feb. 6, 2013, the disclosure of the prior application of which is hereby incorporated in its entirety by reference.

TECHNICAL FIELD

The present invention relates to a dielectric ceramic composition capable of low-temperature sintering with a low relative dielectric constant and an electronic element and a composite electronic element such as a common mode filter obtained by applying the dielectric ceramic composition.

BACKGROUND ART

In recent years, as electronic elements employed in a communication device such as a mobile phone are miniaturized with high performance at a high frequency range, demands for electronic elements such as an LC composite electronic element or a common mode filter capable of exhibiting a high attenuation capability at a high frequency range abruptly increase.

Currently, coils of LC composite electronic elements or the common mode filters are made of a magnetic substance such as Ni—Cu—Zn-based ferrite or a nonmagnetic Cu—Zn-based ferrite or dielectric material. However, such a substance has a relatively high dielectric constant of approximately 8 to 15 and is susceptible to a stray capacitance. For this reason, such a substance has a limitation in application to a high frequency environment, and it is demanded to provide a material having a lower relative dielectric constant (for example, 4.9 or lower).

In particular, it is difficult to implement a dielectric constant lower than 5, suitable for a recent high-frequency environment using a crystal substance such as mullite or forsterite having a dielectric constant of 6 to 7. Thus, it is demanded to develop a material using glass having a low-dielectric constant.

LC composite electronic elements or common mode filters are formed by co-firing different materials (for example, a capacitor material and a coil material). For this reason, it is necessary to match the linear expansion coefficients between different materials as close as possible.

In addition, it is desirable to use a conductive material containing silver (Ag) in order to reduce a cost of the conductive material or a direct current (DC) resistance. Furthermore, it is desirable to use a material sinterable at a low temperature equal to or lower than a melting point of Ag (for example, equal to or lower than 950° C.).

As such a ceramic material capable of a low-temperature sintering, for example, JP H09-241068A proposed a ceramic substrate in which a thermal expansion coefficient is controlled based on a ratio between quartz and fused quartz (amorphous silica) with a low relative dielectric constant of approximately 4.2.

However, the low-temperature sintering ceramic material disclosed in JP H09-241068A has a linear expansion coefficient of approximately $80 \times 10^{-7}/°C.$, which is still different from a linear expansion coefficient of ferrite, $95 \times 10^{-7}/°C.$ to $115 \times 10^{-7}/°C.$ Therefore, it was difficult to perform excellent unification co-firing of different materials for preventing a crack caused by a difference of the linear expansion coefficient.

In the unification co-firing of ferrite, typically, a glass component of $B_2O_3$ is dispersed into ferrite, and a glass component of a sintered body is reduced. For this reason, sinterability is degraded, and silver (Ag) used in the internal electrode is easily dispersed into the sintered body. Therefore, reduction/deformation of the internal electrode is promoted, and properties as an electronic element and reliability may be degraded.

CITATION LIST

Patent Literatures

[Patent Document 1] JP H09-241068A

SUMMARY OF INVENTION

It is therefore an object of this invention to provide a dielectric ceramic composition capable of sintering at a low temperature, implementing a low relative dielectric constant, providing other excellent properties (such as a relative density and an insulation resistance), performing co-firing of different materials, and suppressing dispersion of Ag in the sintered body when the internal electrode is formed.

It is therefore another object of this invention to provide an electronic element and a multilayer common mode filter having a nonmagnetic layer composed of this dielectric ceramic composition, and a multilayer composite electronic element such as a multilayer common mode filter having an electrostatic discharge (ESD) protection functionality.

According to an aspect of the invention, there is provided a dielectric ceramic composition including: a main ingredient containing $SiO_2$—$K_2O$—$B_2O_3$-based glass of 40 to 65 weight %, quartz of 35 to 50 weight %, and amorphous silica of remaining weight %; and a subsidiary ingredient containing alumina of 1.5 to 4 weight %, $K_2O$-MO—$SiO_2$—$B_2O_3$-based glass (where "MO" denotes at least any one selected from a group consisting of CaO and SrO) of 5 to 20 weight % relative to the main ingredient of 100 weight %.

According to the invention, it is possible to obtain a dielectric ceramic composition, suitably unified with Ni—Cu—Zn ferrite, capable of sintering at a low temperature (for example, 950° C. or lower), adjusting a linear expansion coefficient to a desired range (for example, $95 \times 10^{-7}/°C.$ to $115 \times 10^{-7}/°C.$), and obtaining a high insulation resistance with a high density and a low dielectric constant (for example, 4.9 or lower).

If the dielectric ceramic composition according to the present invention is employed in the nonmagnetic layer of the electronic element having an silver (Ag) electrode, it is possible to suppress dispersion of Ag in the sintered body and effectively prevent reduction/deformation of the internal electrode. As a result, it is possible to improve properties as an electronic element and reliability.

It is preferable that the $SiO_2$—$K_2O$—$B_2O_3$-based glass contained in the main ingredient have a glass transition point of 480 to 520° C.

It is preferable that the $K_2O$-MO—$SiO_2$—$B_2O_3$-based glass contained in the subsidiary ingredient have a linear expansion coefficient of $105 \times 10^{-7}/°C.$ to $125 \times 10^{-7}/°C.$ and a softening point of 580 to 680° C.

According to another aspect of the invention, there is provided an electronic element including a nonmagnetic layer, wherein the nonmagnetic layer has any one of the dielectric ceramic compositions described above.

According to further another aspect of the invention, there is provided a multilayer composite electronic element including: a filter portion having a coil conductor and a nonmagnetic layer; and an exterior portion including the magnetic layer, wherein the coil conductor contains Ag as a conductive material, and the nonmagnetic layer has any one of the dielectric ceramic compositions described above.

It is preferable that the multilayer composite electronic element according to the invention be a multilayer common mode filter or a multilayer common mode filter having an electrostatic discharge (ESD) protection functionality.

DESCRIPTION OF EMBODIMENTS

Hereinafter, a multilayer composite electronic element according to an embodiment of the invention will be described with reference to the accompanying drawings.
Multilayer Common Mode Filter Referring to FIG. 1A, a multilayer common mode filter 1 as a multilayer composite electronic element according to an embodiment of the invention has external electrodes 2 to 9 formed on a main body multilayer portion 10. Although there is no limitation, the multilayer common mode filter 1 typically has a rectangular shape. In addition, a dimension thereof may be appropriately set depending on application without any limitation. Typically, a dimension of the multilayer common mode filter 1 is set to approximately 2.0 to 0.4 mm×1.0 to 0.3 mm×0.7 to 0.3 mm. First, a structure of the multilayer common mode filter according to an embodiment of the invention will be described.

Figure 2A:
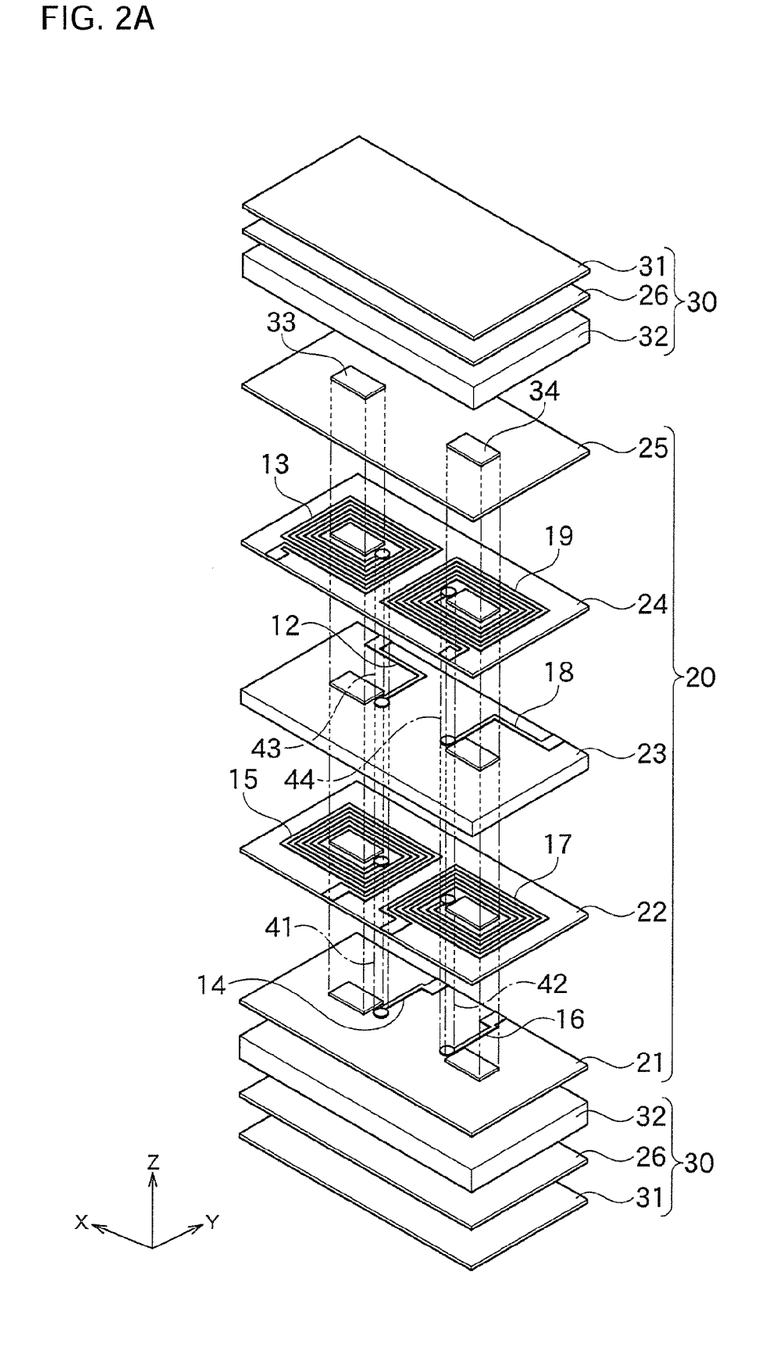
FIG. 2A is an exploded perspective view illustrating a stack structure of the multilayer common mode filter of FIG. 1A.

Referring to FIG. 2A, the main body multilayer portion 10 according to this embodiment includes a lower exterior portion 30, an interior portion 20, and an upper exterior portion 30 stacked in a stacking direction (Z-axis direction). In the interior portion 20, a pair of coils are formed on a plane (X-Y plane) perpendicular to the Z-axis direction, and a pair of coils are also formed in the Z-axis direction.

The upper and lower exterior portions 30 have similar stack structure, including a magnetic layer 31 in the outermost side, a nonmagnetic layer 26, and an internal magnetic layer 32. Each of the layers 31, 26, and 32 may have either a single layer or a plurality of layers.

In the interior portion 20, nonmagnetic layers 21 to 25 are stacked in the Z-axis direction. Preferably, the nonmagnetic layers 21 to 25 are made of the same dielectric ceramic composition as that of the nonmagnetic layer 26 of the exterior portion 30, and materials thereof will be described below. It is noted that the nonmagnetic layers are not necessarily made of perfectly the same material, and the type of the nonmagnetic layer may be changed between the exterior portion 30 and the interior portion 20. In addition, each of the nonmagnetic layers 21 to 25 may have either a single layer or a plurality of layers.

According to this embodiment, a pair of core through-holes are formed in each of the nonmagnetic layers 21 to 25 with a predetermined distance in the X-axis direction. Core magnetic bodies 33 and 34 penetrating in the Z-axis direction are buried in each through-hole. Such core magnetic bodies 33 and 34 are preferably connected to the internal magnetic layer 32 arranged in the exterior portion 30.

In order to form coils around each core magnetic body 33 and 34, coil conductors 12 to 19 having a predetermined pattern are formed in each of the nonmagnetic layers 21 to 25. The coil conductors 12 to 19 located in different layers are connected to each other through through-hole electrodes 41 to 44. Each coil conductor 12 to 19 is connected to external electrodes 2 to 9, respectively, as illustrated in FIG. 1A and has a pattern in which a pair of coils are formed in the Z-axis direction around the core magnetic bodies 33 and 34, respectively.

Figure 1A:
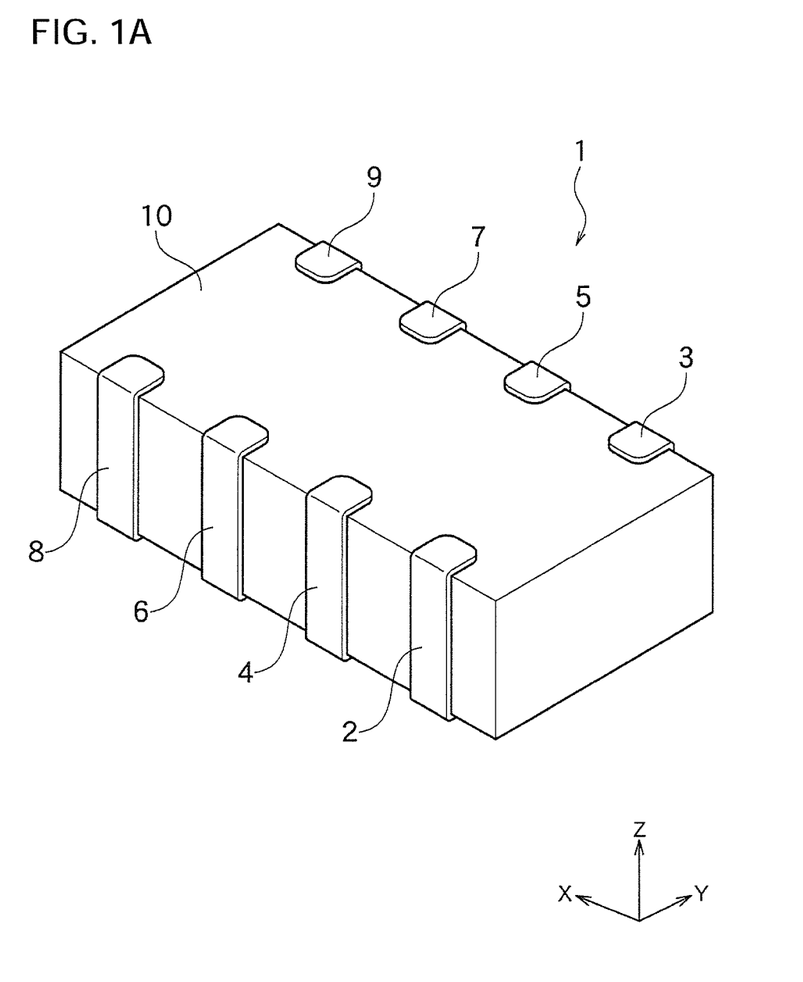
FIG. 1A is a perspective view illustrating a multilayer common mode filter according to an embodiment of the invention.

In the embodiments illustrated in FIGS. 1A and 2A, a common mode filter having a pair of coils arranged in a planar direction has been exemplary described. However, the invention is not limited to the structure of the common mode filter. For example, structures illustrated in FIGS. 1B and 2B may also be conceived.

Figure 1B:
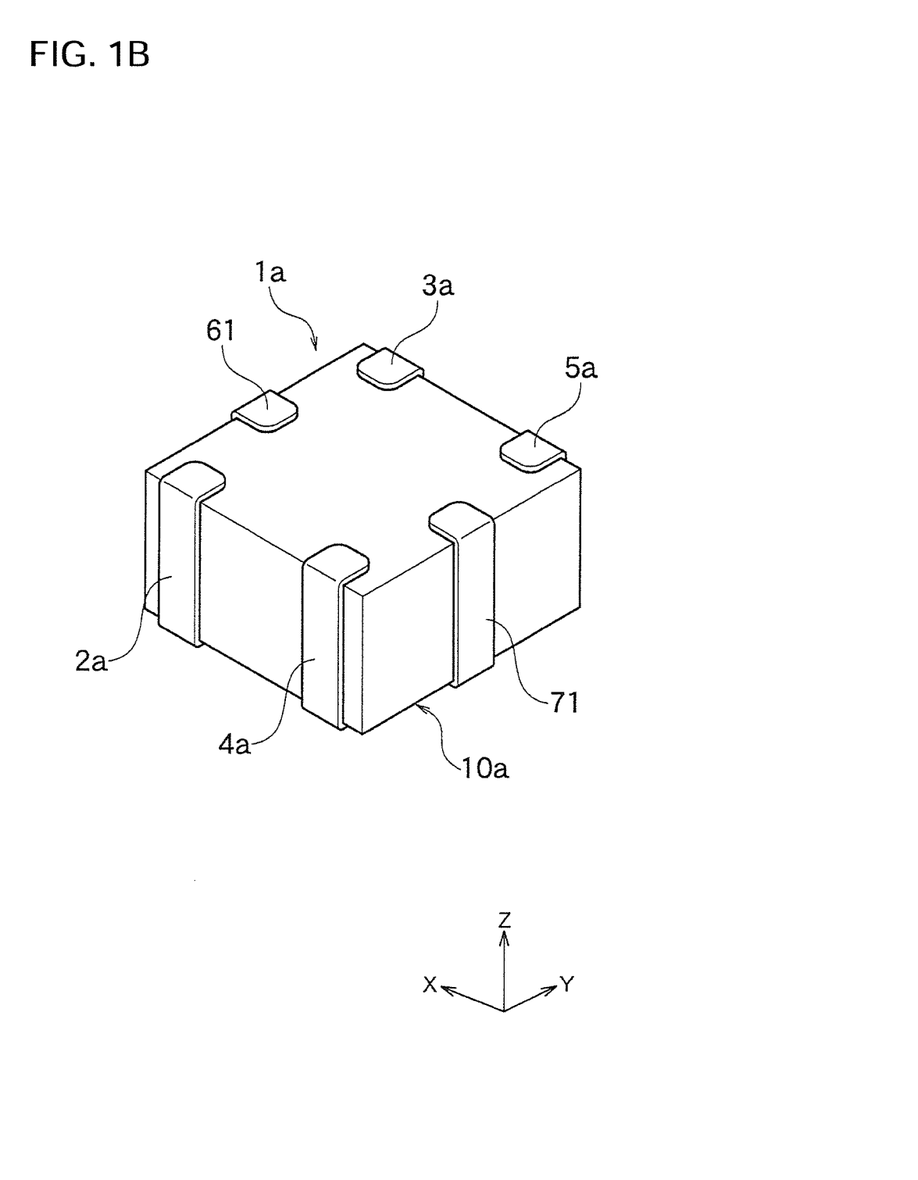
FIG. 1B is a perspective view illustrating a multilayer common mode filter according to another embodiment of the invention.
Figure 2B:
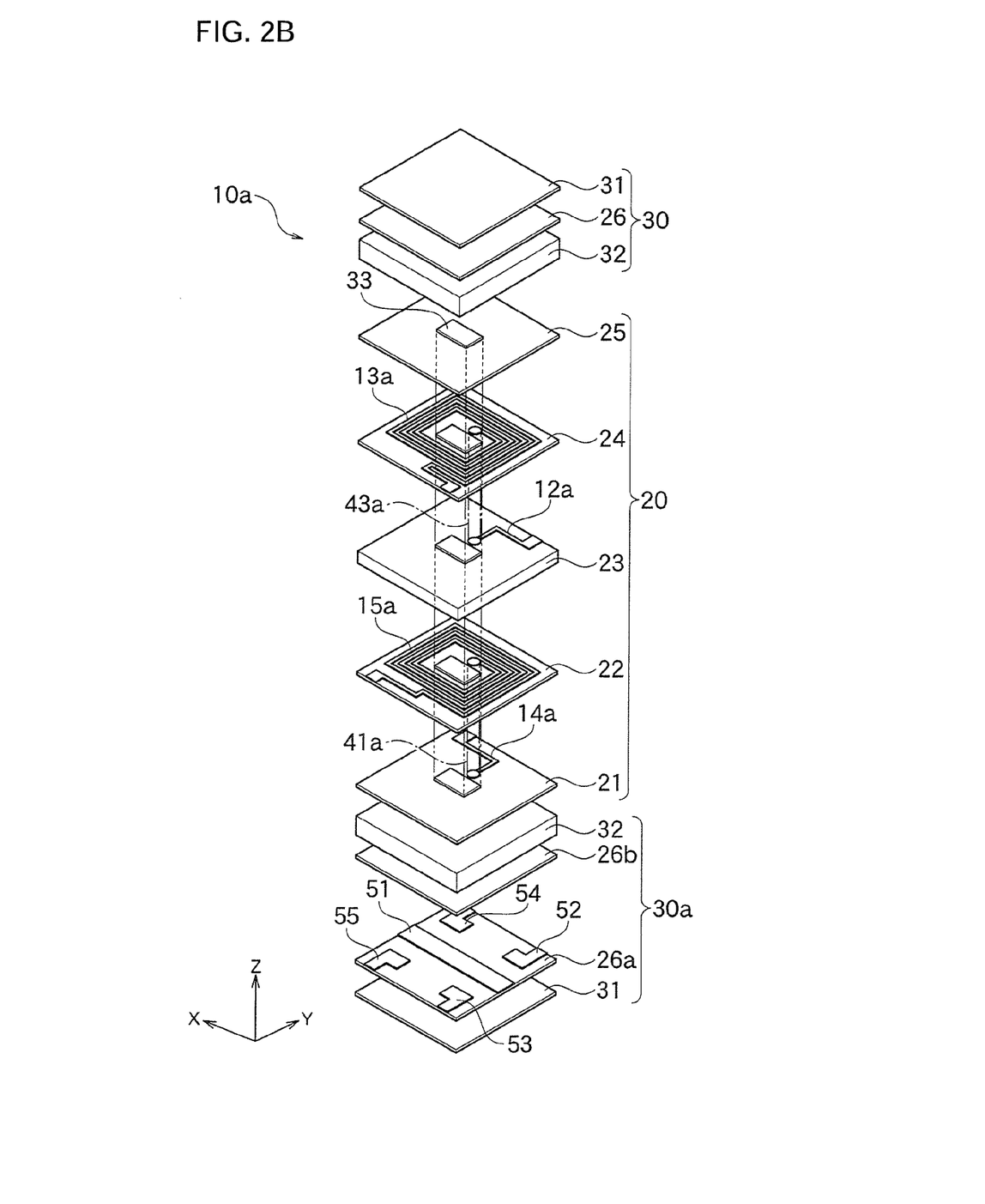
FIG. 2B is an exploded perspective view illustrating a stack structure of the multilayer common mode filter of FIG. 1B.

In the common mode filter 1a, the main body multilayer portion 10a has external electrodes 2a to 5a and ESD external electrodes 61 and 71 as illustrated in FIG. 1B. According to this embodiment, as illustrated in FIG. 2B, the main body multilayer portion 10a has a stack structure including a lower exterior portion 30a, an interior portion 20, and an upper exterior portion 30 stacked in a stacking direction (Z-axis direction), and the interior portion 20 has a single coil on a plane perpendicular to the Z-axis direction (X-Y plane) and a pair of coils in the Z-axis direction.

According to this embodiment, the lower exterior portion 30a and the upper exterior portion 30 have different stack structures. In the lower exterior portion 30a, unlike the upper exterior portion 30, the ESD conductor layers 51 to 55 having a predetermined pattern are formed between the nonmagnetic layers 26a and 26b. The conductor layers 51 to 55 may be formed of the same conductive layer as that of the coil conductors 12a to 15a, and the coil conductors 12a to 15a may be formed of the same material as those of the coil conductors 12 to 19 as illustrated in FIG. 2A.

In the interior portion 20, the nonmagnetic layers 21 to 25 are stacked in the Z-axis direction. Preferably, the nonmagnetic layers 21 to 25 are formed of the same material of the dielectric ceramic composition as those of the nonmagnetic layers 26 and 26a included in the exterior portions 30 and 30a. The material thereof will be described below. It is noted that the dielectric ceramic compositions are not necessarily perfectly the same, but the type of the nonmagnetic layer may be changed between the exterior portions 30 and 30a and the interior portion 20. In addition, each of the nonmagnetic layers 21 to 25 may have either a single layer or a plurality of layers.

According to this embodiment, a single core through-hole is formed in each of the nonmagnetic layers 21 to 25, and a core magnetic body 33 penetrating in the Z-axis direction is buried in the through-hole. Preferably, the core magnetic body 33 is connected to the internal magnetic layer 32 arranged in the exterior portion 30.

In order to form each coil around the core magnetic body 33, coil conductors 12a to 15a having a predetermined pattern are formed in each of the nonmagnetic layers 21 to 25, and the coil conductors 12a to 15a located in different layers are connected to each other through each of the through-hole electrodes 41a and 43a. The coil conductors 12a to 15a are connected to the external electrodes 2a to 5a, respectively, illustrated in FIG. 1B, a pair of coils separated in the Z-axis direction are formed around the core magnetic body 33. In addition, both ends of the ESD conductor layer 51 are connected to the ESD external electrodes 61 and 71.

Figure 2C:
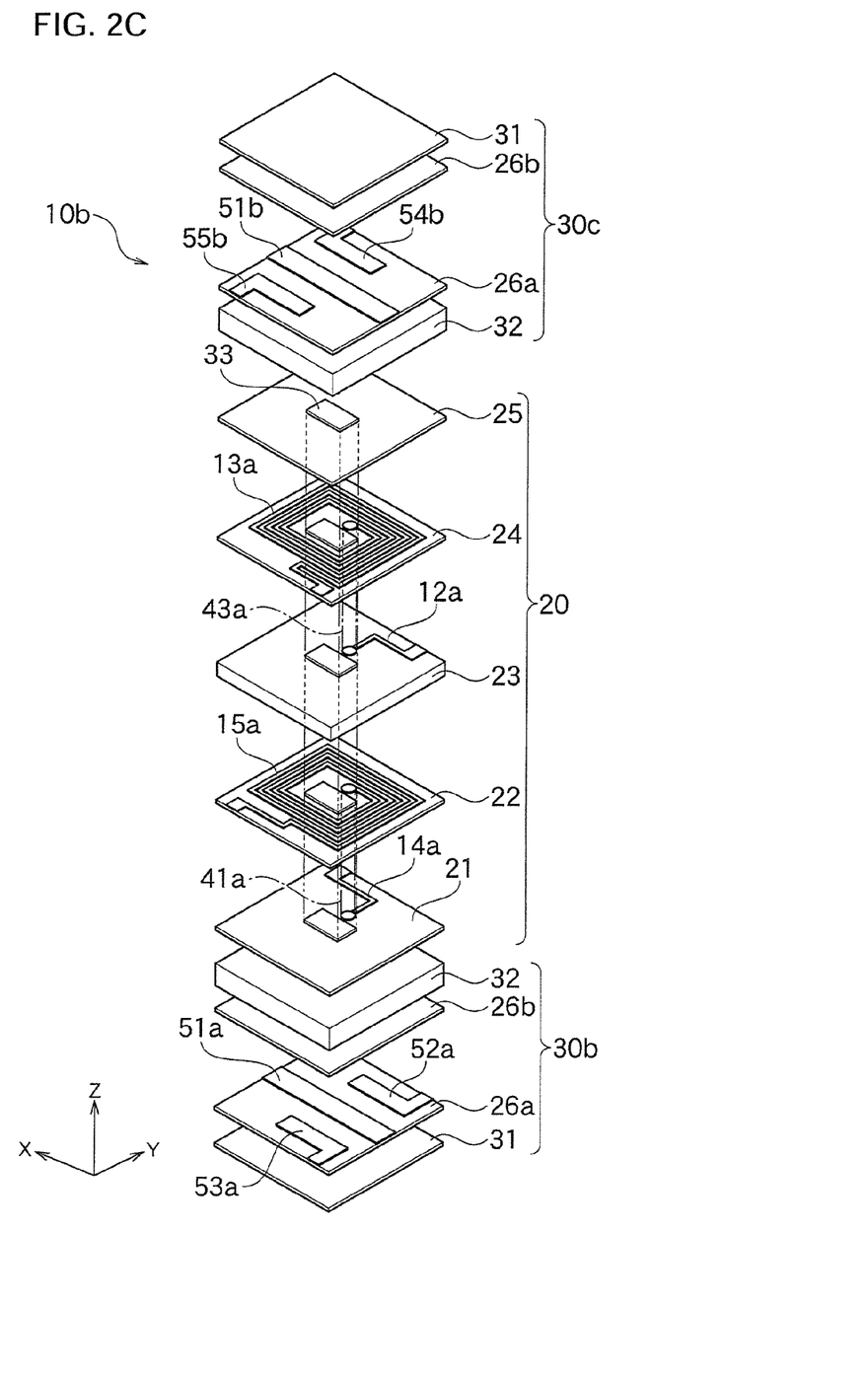
FIG. 2C is an exploded perspective view illustrating a stack structure of the multilayer common mode filter of FIG. 1B according to another embodiment of the invention.

FIG. 2C illustrates a modification of the common mode filter of FIG. 2B. In this main body multilayer portion 10b, ESD conductor layers 51a to 53a, 51b, 54b, and 55b are formed in both the exterior portions 30b and 30c in the Z-axis direction. Both ends of the ESD conductor layers 51a and 51b are connected to the ESD external electrodes 61 and 71 of FIG. 1B. It is noted that like reference numerals denote like elements through FIGS. 1A to 2C, and descriptions thereof will not be repeated.

The nonmagnetic layers 21 to 25, 26, 26a, and 26b described above are made of the dielectric ceramic composition according to an embodiment of the invention.

The dielectric ceramic composition according to this embodiment contains, as a main ingredient, $SiO_2$—$K_2O$—$B_2O_3$-based glass and quartz. The remaining portion is made of amorphous silica as necessary.

Out of the main ingredient of 100 weight %, the content of $SiO_2$—$K_2O$—$B_2O_3$-based glass is set to 40 to 65 weight %, preferably 45 to 60 weight %, and more preferably, 47.5 to 57.5 weight %. When the content of $SiO_2$—$K_2O$—$B_2O_3$-based glass is smaller than 40 weight %, it may be difficult to obtain sufficient sinterability. When the content of $SiO_2$—$K_2O$—$B_2O_3$-based glass is larger than 65 weight %, it is difficult to add the amount of quartz necessary to reliably obtain the linear expansion coefficient.

The $SiO_2$—$K_2O$—$B_2O_3$-based glass may include any one commercially available in the market without any particular limitation. Preferably, the $SiO_2$—$K_2O$—$B_2O_3$-based glass may be borosilicate glass having a glass transition point of approximately 480 to 520° C. and a linear expansion coefficient of $20\times10^{-7}$/° C. to $28\times10^{-7}$/° C. The glass transition point and the linear expansion coefficient are measured using a thermomechanical analyzer (TMA).

The $SiO_2$—$K_2O$—$B_2O_3$-based glass primarily contains $SiO_2$, $K_2O$, and $B_2O_3$. Preferably, out of 100 weight % of the $SiO_2$—$K_2O$—$B_2O_3$-based glass, the content of $SiO_2$ is set to 77 to 83 weight %, the content of $K_2O$ is set to 1.6 to 2.7 weight %, and the content of $B_2O_3$ is set to 15 to 20 weight %. The glass may contain $Al_2O_3$ or $ZrO_2$ as long as the effect of the invention is not obscured. Preferably, the content of $Al_2O_3$ is set to 0.5 weight % or smaller, and the content of $ZrO_2$ is set to 0.2 weight % or smaller.

Out of the main ingredient of 100 weight %, the content of quartz is set to 35 to 50 weight %, preferably 37 to 47 weight %, and more preferably 39 to 45 weight %. When the content of quartz is smaller than 35 weight %, the linear expansion coefficient may fall below that of Ni—Cu—Zn ferrite. When the content of quartz is larger than 50 weight %, the linear expansion coefficient may exceed that of Ni—Cu—Zn ferrite.

The remaining part of the main ingredient may include only amorphous silica.

The amorphous silica may include, but not particularly limited to, for example, a relatively inexpensive one manufactured through a fusion method or an expensive one manufactured with high purity through a gas phase method such as thermal decomposition of silicon tetrachloride.

In addition to the main ingredients described above, the dielectric ceramic composition according to the invention contains, as subsidiary ingredients, alumina and $K_2O$-MO—$SiO_2$—$B_2O_3$-based glass (where "MO" denotes at least one selected from a group consisting of CaO and SrO).

The content of alumina is set to 1.5 to 4 weight %, preferably 1.6 to 3.5 weight %, and more particularly 1.7 to 3 weight % relative to the main ingredient of 100 weight %. When the content of alumina is smaller than 1.5 weight %, it may be difficult to suppress generation of cristobalite, and a crack may be generated due to a change of the linear expansion coefficient caused by generation of cristobalite. Meanwhile, when the content of alumina is larger than 4 weight %, it may be difficult to obtain sufficient sinterability.

The content of $K_2O$-MO—$SiO_2$—$B_2O_3$-based glass (where "MO" denotes at least one selected from a group consisting of CaO and SrO) is set to 5 to 20 weight %, preferably 6 to 18 weight %, and more particularly 8 to 15 weight % relative to the main ingredient of 100 weight %. When the content of $K_2O$-MO—$SiO_2$—$B_2O_3$-based glass is smaller than 5 weight %, it is difficult to obtain sufficient sinterability, and the amount of $K_2O$ decreases so that silver (Ag) serving as an internal electrode may be easily dispersed in the sintered body and generate reduction/deformation of the internal electrode. Meanwhile, when the content of $K_2O$-MO—$SiO_2$—$B_2O_3$-based glass is larger than 20 weight %, a factor of generating cristobalite of $K_2O$ is significantly predominant so that a crack may be generated due to a change of the linear expansion coefficient caused by generation of cristobalite.

The $K_2O$-MO—$SiO_2$—$B_2O_3$-based glass may include any one commercially available in the market without any particular limitation. Preferably, the $K_2O$-MO—$SiO_2$—$B_2O_3$-based glass is low-softening point borosilicate glass having a linear expansion coefficient of $105\times10^{-7}$/° C. to $125\times10^{-7}$/° C. and a softening point of 580 to 680° C. The linear expansion coefficient is measured using a thermomechanical analyzer (TMA), and the softening point is measured using a differential thermal analyzer (DTA).

The $K_2O$-MO—$SiO_2$—$B_2O_3$-based glass is primarily made of $K_2O$, MO, $SiO_2$, and $B_2O_3$. Preferably, out of 100 weight % of the $K_2O$-MO—$SiO_2$—$B_2O_3$-based glass, the content of $K_2O$ is set to 7.5 to 15 weight %, the content of MO is set to 5 to 50 weight %, the content of $SiO_2$ is set to 18 to 22 weight %, and the content of $B_2O_3$ is set to 22 to 30 weight %. Here, "MO" denotes an alkaline earth metal oxide selected from a group consisting of CaO and SrO. It is noted that the $K_2O$-MO—$SiO_2$—$B_2O_3$-based glass may contain $Al_2O_3$ and $ZrO_2$ as long as the effect of the invention is not obscured. Preferably, the content of $Al_2O_3$ is set to 0.5 weight % or smaller, and the content of $ZrO_2$ is set to 0.2 weight % or smaller.

In recent years, a fast serial transmission interface is frequently employed in electronic devices such as a mobile phone or a personal computer. Accordingly, a demand for a common mode filter having a high cut-off frequency also increases.

A dielectric material suitably employed in electronic elements such as the common mode filter is required to have a dielectric ceramic composition capable of sintering at a low temperature (for example, 950° C. or lower), implementing a low relative dielectric constant (for example, 4.9 or lower), providing other excellent properties (such as a relative density or an insulation resistance), performing co-firing of different materials, and suppressing dispersion of silver (Ag) in the sintered body when an internal electrode is formed.

In particular, in order to allow co-firing of different materials with ferrite, it is necessary to match the linear expansion coefficients of other materials with that of ferrite. However, since the linear expansion coefficient is a unique material property, it is significantly difficult to change the linear expansion coefficient arbitrarily.

For this reason, in the related art, in order to match the linear expansion coefficient of the dielectric ceramic composition with that of the Ni—Cu—Zn ferrite, a higher linear expansion coefficient is obtained using quartz which has a high linear expansion coefficient and a low relative dielectric constant. However, when a higher linear expansion coefficient is obtained only using quartz, there is a problem in that discontinuity of the linear expansion coefficient caused by α→β phase transition around a temperature of 575° C. also increases.

Typically, a glass component such as $B_2O_3$ is easily dispersed in ferrite, and a glass component in the sintered body tends to decrease. As a result, sinterability is degraded, and silver (Ag) used in the internal electrode is easily dispersed into the sintered body, so that reduction/deformation of the internal electrode is generated, and reliability and properties as an electronic element may be degraded.

Meanwhile, it is known that $K_2O$ can suppress dispersion of Ag in the dielectric ceramic composition. However, in the dielectric ceramic composition in the related art, $K_2O$ is typically added in the form of a chemical substance such as $K_2CO_3$. In this case, there is a problem in that the main ingredient material, that is, $SiO_2$—$K_2O$—$B_2O_3$-based glass is crystallized when $K_2CO_3$ is added. This may degrade sinterability.

In view of such a problem, the inventors made diligent studies and found a dielectric ceramic composition of the invention, capable of sintering at a low temperature (for example, 950° C. or lower), implementing a low relative dielectric constant (for example, 4.9 or lower), providing other excellent properties (such as a relative density or an insulation resistance), performing co-firing of different materials, and suppressing dispersion of Ag in the sintered body when the internal electrode is formed.

That is, in the dielectric ceramic composition according to this embodiment, as a main ingredient, quartz and amorphous silica having a low dielectric constant are added as a filler to $SiO_2$—$K_2O$—$B_2O_3$-based glass having a low dielectric constant, and alumina having a high dielectric constant of approximately 7 to 10 and $K_2O$-MO—$SiO_2$—$B_2O_3$-based glass (where "MO" denotes any one selected from a group consisting of CaO and SrO) are added as a subsidiary ingredient. By suppressing the amount of the subsidiary ingredient, it is possible to perform sintering at a low temperature of 950° C. or lower and suppressing the relative dielectric constant to 4.9 or lower.

In particular, in the dielectric ceramic composition according to this embodiment, the component $K_2O$ is added in the form of $K_2O$-MO—$SiO_2$—$B_2O_3$-based glass, thereby it is possible to considerably suppress in crystallization and to obtain a high sinterability. As a result, it is possible to effectively suppress reduction/deformation of Ag serving as an internal electrode even after co-firing for unification with ferrite and obtain high reliability as an electronic element.

In the dielectric ceramic composition according to this embodiment, by adding $K_2O$-MO—$SiO_2$—$B_2O_3$-based glass having a high linear expansion coefficient, it is possible to alleviate discontinuity of the linear expansion coefficient and remove a problem in unification with Ni—Cu—Zn ferrite.

The nonmagnetic layer 22 or 24 interposed between the coil conductors located in neighboring layers in the Z-axis direction to form a single coil has a thickness of, preferably, 5 to 40 μm, and more preferably 8 to 25 μm. The nonmagnetic layer 23 for separating the coils in the Z-axis direction preferably has a thickness of 5 to 60 μm.

The thicknesses of the coil conductors 11 to 19 may be appropriately determined depending on the thickness of the nonmagnetic layer without a particular limitation.

According to this embodiment, the nonmagnetic layer contains the dielectric ceramic composition according to the present invention.

The coil conductors 11 to 19, the ESD conductor layers 51 to 54, 51a to 53a, 51b, 54b, and 55b, and the through-hole conductors 41 to 44, 41a, and 43a contain silver (Ag) as a conduction material. For example, Ag or an Ag-alloy (such as Ag—Pd alloy or Ag with a small amount of Zr) is preferably used as a conductor. The dielectric ceramic composition according to the present invention can be fired at a low temperature (for example, 950° C. or lower). Therefore, according to this embodiment, it is possible to employ silver (Ag) having a low DC resistance as a conduction material.

The external electrodes 2 to 9, 2a to 5a, 61, and 71 may be made of, but not particularly limited to, a conduction material such as silver. This electrode is preferably plated with Cu—Ni—Sn, Ni—Sn, Ni—Au, or Ni—Ag, or the like.

Method of Manufacturing Multilayer Common Mode Filter 1

The multilayer common mode filter according to this embodiment is manufactured by preparing a nonmagnetic greensheet and a magnetic greensheet similar to those of the multilayer common mode filter of the related art, forming main body multilayer portions 10, 10a, and 10b in a green state, firing them, and then forming external electrodes 1 to 9, 2a to 5a, 61, and 71. Hereinafter, the manufacturing method will be described in detail.

Manufacturing of Nonmagnetic Greensheet

First, a raw material of the nonmagnetic substance of the nonmagnetic layer is prepared. According to this embodiment, as a raw material of the nonmagnetic substance, a raw material of the dielectric ceramic composition according to the present invention is employed.

As a raw material of the main ingredient of the dielectric ceramic composition according to the present invention, $SiO_2$—$K_2O$—$B_2O_3$-based glass and quartz are employed, and amorphous silica is also employed as necessary. Such materials may be selected from those commercially available in the market.

In addition, as a raw material of the subsidiary ingredient of the dielectric ceramic composition according to the present invention, alumina and $K_2O$-MO—$SiO_2$—$B_2O_3$-based glass (where "MO" denotes at least any one selected from a group consisting of CaO and SrO) may be employed. Such materials may be selected from those commercially available in the market.

According to the present embodiment, first, raw materials of the main ingredient and the subsidiary ingredient are mixed. For example, the mixing may be performed, but not particularly limited to, through dry-mixing while the raw materials have a powder state. Alternatively, wet-mixing may be performed using a ball mill and the like by adding water, an organic solvent, or a dispersant to the raw material powder.

Then, the obtained raw material powder is slurrified to prepare a nonmagnetic layer paste. The nonmagnetic layer paste may be an organic paste obtained by kneading the raw material power and an organic vehicle or a water-based paste.

The coil conductor paste is prepared, for example, by kneading the aforementioned organic vehicle and a conductive material such as silver.

The content of the organic vehicle of each paste described above is not particularly limited. As a typical content, for example, the organic vehicle may contain a binder of 5 to 30 weight % and a solvent of 50 to 150 weight % relative to 100 weight % of powder before the firing. In addition, each paste may contain various additives such as a dispersant and a plasticizer as necessary. A total content of such additives is preferably limited to 10 weight % or smaller.

Then, the nonmagnetic layer paste is sheeted using a doctor blade method and the like to form a nonmagnetic greensheet.

Then, a coil conductor is formed on the nonmagnetic greensheet manufactured as described above. The coil conductor is formed on the nonmagnetic greensheet using a coil conductor paste through a screen printing method and the like. It is noted that the coil conductor formation pattern may be selected depending on a circuit configuration of the manufactured common mode filter and the like.

Then, a through-hole is formed in the coil conductor on the nonmagnetic greensheet. The through-hole may be formed, for example, but not particularly limited to, through a laser machining and the like. It is noted that the through-hole formation location is not particularly limited if it is on the coil conductor.

Manufacturing of Magnetic Greensheet

First, the main ingredient raw materials of the magnetic layer and the core magnetic body are slurrified to prepare a magnetic layer paste. The magnetic layer paste may be prepared through a method similar to that of the magnetic layer paste described above.

The main ingredient raw material may include iron oxides ($\alpha$-$Fe_2O_3$), copper oxides (CuO), zinc oxides (ZnO), nickel oxides (NiO), complex oxides, and the like. In addition, various compounds that can be changed to oxides or complex oxides described above through firing may be employed. A material that can be changed to the oxides described above through firing may include, for example, a single material of metal, carbonates, oxalates, nitrates, hydroxides, halides, organic metal compounds, and the like. In addition, the raw material of the magnetic substance may include starting materials of the subsidiary ingredient as necessary in addition to the main ingredient described above.

It is noted that, before the magnetic layer paste is obtained, mixed powder of each starting material of the magnetic body may be preliminarily fired, and then the powder may be pulverized.

Then, the magnetic layer paste is sheeted through a doctor blade method and the like to form a magnetic greensheet.

Stacking of Greensheet

Then, each of the nonmagnetic greensheet and the magnetic greensheet manufactured as described above are sequentially stacked to form the main body multilayer portion 10 having a green state.

Firing of Main Body Multilayer Portion and Formation of External Electrode

Then, the main body multilayer portion having a green state, manufactured by sequentially stacking the magnetic greensheet and the nonmagnetic greensheet, is fired. The firing condition is set such that a temperature rise rate is preferably set to 50 to 500° C./hour, and more preferably 200 to 300° C./hour, a holding temperature is set to preferably 840 to 900° C., a temperature sustaining time is set to preferably 0.5 to 8 hours, and more preferably 1 to 3 hours, and a cooling rate is set to preferably 50 to 500° C./hour, and more preferably 200 to 300° C./hour.

Then, end face polishing is performed for the main body multilayer portion subjected to the firing, for example, through barrel polishing, sand blasting, and the like. An external electrode paste is applied and dried on both side surfaces of the main body multilayer portion, and then, firing is performed. The external electrode paste may be prepared by kneading the aforementioned organic vehicle and a conductive material such as silver. It is noted that electroplating is preferably performed on the resulting external electrode using Cu—Ni—Sn, Ni—Sn, Ni—Au, Ni—Ag, and the like.

While the embodiments of the invention have been described hereinbefore, they are not intended to limit the invention, but may be variously modified or changed without departing from the spirit and scope of the invention.

For example, the dielectric ceramic composition according to this embodiment may contain an oxide of an unavoidable impurity of the raw material in addition to the aforementioned ingredients by several to several hundreds ppm.

When the nonmagnetic greensheet according to this embodiment is manufactured, the main ingredient raw material and the subsidiary ingredient raw material are simultaneously mixed and slurrified to prepare the nonmagnetic layer paste. However, the invention is not limited thereto. As necessary, only the main ingredient raw material or a mixture of the main ingredient raw material and the subsidiary ingredient raw material may be preliminarily fired, and the powder obtained through the preliminary firing may be pulverized and slurrified to obtain the nonmagnetic layer paste.

The dielectric ceramic composition according to the invention is employed in the nonmagnetic layer of the filter unit of the common mode filter in the aforementioned embodiment. However, without any particular limitation, the dielectric ceramic composition according to the invention may also be suitably employed in nonmagnetic layers of various electronic elements.

While a common mode filter has been exemplarily described as a multilayer composite electronic element according to the invention in the aforementioned embodiment, the multilayer composite electronic element according to the invention is not limited to the multilayered filter. In addition, the dielectric ceramic composition according to the invention may be applied to elements such as an LC composite electronic element other than the multilayer composite electronic element.

The dielectric ceramic composition according to the invention may be applied to a nonmagnetic layer of a multilayer ceramic coil having a coil portion formed by stacking a coil conductor and a nonmagnetic layer. In this case, silver (Ag) is preferably used as a material of the coil conductor.

EXAMPLES

Hereinafter, the invention will be described in more detail with reference to examples. However, they are not intended to limit the invention.

Example 1

First, as a main ingredient raw material of the dielectric ceramic composition according to the present invention, $SiO_2$—$K_2O$—$B_2O_3$-based glass (Glass 1 having a glass transition point of 510° C. and an average particle diameter of 3.3 µm), quartz, and amorphous silica were prepared. In addition, as a subsidiary ingredient raw material, alumina and $K_2O$—

CaO—SiO$_2$—B$_2$O$_3$-based glass (Glass 2 having a linear expansion coefficient of 118×10$^{-7}$/° C., a softening point of 650° C., and an average particle diameter of 0.8 µm) were prepared. It is noted that, as SiO$_2$—K$_2$O—B$_2$O$_3$-based glass and K$_2$O—CaO—SiO$_2$—B$_2$O$_3$-based glass, those commercially available in the market were used.

The raw materials described above were weighed to obtain the composition described in Table 1, and wet mixing was performed using a ball mill for 40 hours. After the wet mixing, the obtained slurry was dried using a drier to obtain the dielectric ceramic composition.

(Evaluation 1)

The obtained dielectric ceramic composition was granulated by adding an acryl-resin-based binder. Then, compression molding was performed. As a result, a disc-like compact having a diameter of 12 mm and a thickness of 6 mm was obtained. This compact was fired in the air at a temperature of 900° C. for 2 hours to obtain a sintered body. For the resulting sintered body, the following evaluation was performed.

[Relative Density]

A density of the obtained sintered body was computed based on a dimension and a weight of the sintered body subjected to the firing. A density of the sintered body against a theoretical density was computed as a relative density. It was determined satisfactory if the relative density is 90% or higher. The evaluation result is shown in Table 1

[Relative Dielectric Constants ∈s]

A relative dielectric constant (no unit) was computed for the resulting sintered body based on a resonance method (JIS R1627) using a network analyzer (produced by Hewlett-Packard Development Company, L.P., Product No. 8510C). As an evaluation reference, it was determined satisfactory if the relative dielectric constant is 14.9 or lower. The evaluation result is shown in Table 1.

[Insulation Resistance ρ]

First, for the sintered body having electrodes, a resistance value was measured by applying a DC voltage of 25V at a temperature of 25° C. using an insulation resistance meter (Hewlett-Packard Development Company, L.P., Product No. 4329A) for 30 seconds. The insulation resistance ρ (Ω·m) was computed based on this measurement value and an area and a thickness of the electrode of the sintered body. In this example, measurement was performed for 20 samples, and an average thereof was computed for evaluation. As an evaluation reference, it was determined satisfactory if the insulation resistance was $1.0 \times 10^{10}$ Ω·m or higher. The result is shown in Table 1.

[Linear Expansion Coefficient α]

For the resulting sintered body, thermal expansion was measured using a thermal dilatometer (produced by BRUKER AXS GmbH, Product No. TD5000SA) from 25° C. to 700° C. to compute a thermal expansion coefficient α ($10^{-7}$/° C.). As an evaluation reference, it was determined satisfactory when the thermal expansion coefficient was 95×10$^{-7}$/° C. to 115×10$^{-7}$/° C. The result is shown in Table 1.

[Cristobalite Evaluation]

For the resulting sintered body, X-ray diffraction was performed using an X-ray diffractometer (produced by Spectris Co., Ltd., Product Name PANalytical-MPD). As an X-ray source, a Cu-Kα ray was employed. As a measurement condition, a voltage was set to 45 kV, a current was set to 40 mA, a measurement range was set to 2θ=20° to 60°, a step width was set to 0.033°, and a count time was set to 0.20 sec. As an evaluation reference, whether or not there is a crystal peak caused by cristobalite was used. It was determined satisfactory when the cristobalite is not generated. The result is shown in Table 1.

(Evaluation 2)

To the obtained dielectric ceramic composition (having an average particle diameter of 3 µm) of 100 weight %, a binder (acryl resin) of 15 weight %, a solvent (acetone/methylethyl ketone mixture) of 60 weight %, and a plasticizer (benzyl butyl phthalate) of 7.5 weight % were added and mixed to obtain a nonmagnetic layer paste.

Then, the nonmagnetic layer paste was coated on a polyethylene terephthalate (PET) film based on a doctor blade method with a thickness of 20 µm to form a nonmagnetic layer greensheet. Then, the nonmagnetic layer greensheet formed on the PET film was continuously delivered to a drying furnace, and a solvent contained in the nonmagnetic layer greensheet was dried at a temperature of 75° C. for 2 minutes.

Then, a coil conductor paste was prepared by kneading silver powder (having an average particle diameter of 1.5 µm), a binder, and a solvent. Then, a coil conductor layer was formed on the dried nonmagnetic layer greensheet. The resulting material was continuously delivered to the drying furnace again, and the solvent contained in the coil conductor paste was dried at a temperature of 75° C. for 2 minutes.

Then, Ni—Cu—Zn ferrite was prepared through a solid-phase method. To Ni—Cu—Zn ferrite powder subjected to pulverization (having an average particle diameter of 0.8 µm) of 100 weight %, a binder (acryl resin) of 10 weight %, a solvent (acetone/methylethyl ketone mixture) of 50 weight %, and a plasticizer (benzyl butyl phthalate) of 6 weight % were added and mixed to obtain a magnetic layer paste.

Then, the magnetic layer paste was coated on a PET film based on a doctor blade method with a thickness of 20 µm to form a magnetic layer greensheet. Then, the magnetic layer greensheet formed on the PET film was continuously delivered to a drying furnace, and a solvent contained in the magnetic layer greensheet was dried at a temperature of 75° C. for 2 minutes.

In order to obtain the multilayer common mode filter of FIG. 2A, an internal conductor (Ag) was printed on the nonmagnetic layer greensheet, an internal electrode through-hole was formed, and a magnetic core through-hole was formed for the obtained magnetic layer greensheet and the nonmagnetic layer greensheet having the coil conductor. Then, a desired multilayer common mode filter was obtained by stacking the magnetic layer greensheet and the nonmagnetic layer greensheet. The resulting multilayer common mode filter was fired in the air at a temperature of 900° C. for 2 hours to obtain a sintered product of the multilayer common mode filter. The following evaluation was performed for the resulting sintered product.

[Ag Dispersion]

Figure 3A:
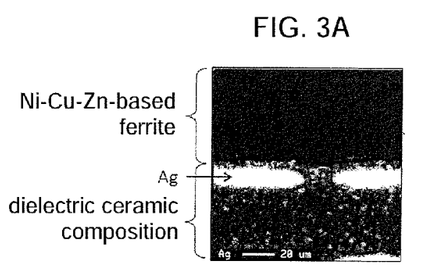
FIG. 3A is diagram illustrating an electron probe microanalyzer (EPMA) mapping analysis result of Ag for Sample 4 in an example of the invention.
Figure 3B:
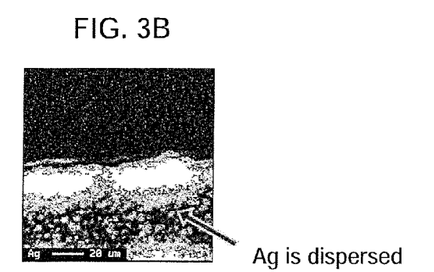
FIG. 3B is a diagram illustrating an EPMA mapping analysis result of Ag for Sample 23 in a comparative example of the invention.

The sintered product was buried in a resin, and mirror polishing was performed. Then, a vicinity of the internal conductor portion (Ag) was observed using an electron probe microanalyser (EPMA) (produced by Nippon Electronics Co., Ltd., Product No. JXA8800) to perform mapping analysis of Ag. As an evaluation reference, it was determined that there is no dispersion if the Ag dispersion to the sintered body is suppressed as illustrated in FIG. 3A, and the shape formed in the printing is maintained. Otherwise, it was determined that there is dispersion if Ag is dispersed to the sintered body as illustrated in FIG. 3B, and the shape formed in the printing is not maintained. In addition, it was determined satisfactory when there is no dispersion of Ag. The result is illustrated in Table 1.

TABLE 1

| Sample No. | Main ingredient (wt %): total 100 wt % | | | Subsidiary ingredient (wt %) for Main ingredient of 100 wt % | | Properties | | | | | |
| --- | --- | --- | --- | --- | --- | --- | --- | --- | --- | --- | --- |
| | Glass 1 | Quartz | Amorphous Silica | Alumina | Glass 2 | Relative Density (%) | Relative Dielectric Constant $\epsilon s$ | Insulation Resistance $\rho$ ($\Omega \cdot m$) | Linear Expansion Coefficient $\alpha$ ($\times 10^{-7}/°C.$) | Cristobalite Generation | Ag Dispersion |
| 1 | 35 | 40 | 25 | 2 | 10 | 84.2 | 4.21 | 3.50E+10 | 94.2 | No | No |
| 2 | 35 | 40 | 25 | 2 | 20 | 87.5 | 4.38 | 2.80E+10 | 96.5 | No | No |
| 3 | 40 | 40 | 20 | 2 | 20 | 91.7 | 4.44 | 1.40E+11 | 98.9 | No | No |
| 4 | 50 | 40 | 10 | 2 | 10 | 97.9 | 4.64 | 1.40E+11 | 98.9 | No | No |
| 5 | 60 | 40 | 0 | 2 | 10 | 98.3 | 4.62 | 1.40E+12 | 96.4 | No | No |
| 6 | 65 | 35 | 0 | 2 | 20 | 99.2 | 4.78 | 8.80E+10 | 96.2 | No | No |
| 7 | 70 | 30 | 0 | 2 | 10 | 99.2 | 4.53 | 6.20E+10 | 91.8 | No | No |
| 8 | 70 | 30 | 0 | 2 | 20 | 99.6 | 4.60 | 1.20E+11 | 93.5 | No | No |
| 9 | 50 | 30 | 20 | 2 | 10 | 95.8 | 4.38 | 3.80E+10 | 89.2 | No | No |
| 10 | 50 | 30 | 20 | 2 | 20 | 97.1 | 4.48 | 2.50E+10 | 94.3 | No | No |
| 11 | 50 | 35 | 15 | 2 | 20 | 98.8 | 4.61 | 1.80E+10 | 95.9 | No | No |
| 12 | 50 | 45 | 5 | 2 | 10 | 98.3 | 4.70 | 1.00E+10 | 106.3 | No | No |
| 13 | 50 | 50 | 0 | 2 | 10 | 97.9 | 4.75 | 5.80E+10 | 111.2 | No | No |
| 14 | 45 | 55 | 0 | 2 | 10 | 95.0 | 4.68 | 1.20E+10 | 116.6 | No | No |
| 15 | 45 | 55 | 0 | 2 | 5 | 88.3 | 4.23 | 3.40E+10 | 110.8 | No | No |
| 16 | 50 | 40 | 10 | 1.25 | 10 | 96.7 | 4.48 | 8.70E+10 | 108.5 | Yes | No |
| 17 | 50 | 40 | 10 | 1.25 | 5 | 95.8 | 4.40 | 3.50E+10 | 104.6 | Yes | No |
| 18 | 50 | 40 | 10 | 1.5 | 10 | 97.1 | 4.53 | 5.80E+10 | 100.6 | No | No |
| 19 | 50 | 40 | 10 | 2.5 | 10 | 90.8 | 4.25 | 3.50E+10 | 96.2 | No | No |
| 20 | 65 | 35 | 0 | 3 | 20 | 95.0 | 4.76 | 4.80E+10 | 98.2 | No | No |
| 21 | 65 | 35 | 0 | 4 | 20 | 91.7 | 4.63 | 5.10E+10 | 96.1 | No | No |
| 22 | 65 | 35 | 0 | 5 | 20 | 88.3 | 4.30 | 9.00E+09 | 94.0 | No | No |
| 23 | 50 | 45 | 5 | 2 | 3 | 95.0 | 4.22 | 1.90E+11 | 96.7 | No | Yes |
| 24 | 50 | 40 | 10 | 2 | 5 | 95.4 | 4.30 | 1.20E+10 | 97.5 | No | No |
| 25 | 50 | 40 | 10 | 2 | 15 | 98.8 | 4.76 | 8.90E+10 | 100.5 | No | No |
| 26 | 50 | 40 | 10 | 2 | 20 | 99.2 | 4.82 | 2.00E+11 | 102.1 | No | No |
| 27 | 50 | 40 | 10 | 2 | 25 | 99.2 | 4.95 | 4.00E+12 | 121.2 | Yes | No |
| 28 | 65 | 35 | 0 | 5 | 25 | 89.6 | 4.45 | 1.60E+11 | 108.7 | Yes | No |

Glass 1 = $SiO_2$—$K_2O$—$B_2O_3$-based Glass
Glass 2 = $K_2O$—CaO—$SiO_2$—$B_2O_3$-based Glass As shown in Table 1, in the case of the dielectric ceramic composition according to the present invention (Sample Nos. 3 to 6, 11 to 13, 18 to 21, and 24 to 26), it was observed that cristobalite is not generated, and the relative density, the relative dielectric constant, the insulation resistance, and the linear expansion coefficient are determined satisfactory in any evaluation. In the common mode filter manufactured using the dielectric ceramic composition according to the present invention, it was observed that the dispersion of Ag is suppressed in the vicinity of the Ag internal conductor.

In comparison, it was observed that at least one of the relative density and the linear expansion coefficient is aggravated in the case of the dielectric ceramic composition (Sample Nos. 1, 2, 7 to 10, 14, and 15) in which the content of at least any one of $SiO_2$—$K_2O$—$B_2O_3$-based glass (Glass 1) and quartz out of the main ingredient composition is not within the range of the present invention.

It was observed that generation of cristobalite is not suppressed in the case of the dielectric ceramic composition (Sample Nos. 16 and 17) in which the content of alumna added as a subsidiary ingredient is smaller than the range of the present invention. In addition, it was observed that the relative density, the insulation resistance, and the linear expansion coefficient are aggravated in the case of the dielectric ceramic composition (Sample No. 22) in which the content of alumina is larger than the range of the present invention.

It was observed that dispersion of Ag is not suppressed in the vicinity of the Ag internal conductor of the common mode filter in the case of the dielectric ceramic composition (Sample No. 23) in which the content of $K_2O$—CaO—$SiO_2$—$B_2O_3$-based glass (Glass 2) added as a subsidiary ingredient is smaller than the range of the present invention. In addition, it was observed that generation of cristobalite is not suppressed, and at least one of the relative density, the relative dielectric constant, and the linear expansion coefficient was aggravated in the case of the dielectric ceramic composition (Sample Nos. 27 and 28) in which the content of the $K_2O$—CaO—$SiO_2$—$B_2O_3$-based glass is larger than the range of the present invention.

REFERENCE SIGNS AND NUMERALS

1 MULTILAYER COMMON MODE FILTER
10, 10a, 10b MAIN BODY MULTILAYER PORTION
1 to 9, 61, 72 EXTERNAL ELECTRODE
12 to 19, 12a to 15a COIL CONDUCTOR
20 INTERIOR PORTION
21 to 25 INNER NONMAGNETIC LAYER
26, 26a, 26b OUTER NONMAGNETIC LAYER
30, 30a to 30c EXTERIOR PORTION
31, 32 MAGNETIC LAYER
33, 34 CORE MAGNETIC BODY
41 to 44, 41a, 43a TROUGH-HOLE ELECTRODE
51 to 55 ESD CONDUCTOR LAYER

The invention claimed is:
1. A dielectric ceramic composition comprising:
a main ingredient containing $SiO_2$—$K_2O$—$B_2O_3$-based glass of 40 to 65 weight % of the main ingredient, quartz of 35 to 50 weight % of the main ingredient, and amorphous silica of remaining weight % of the main ingredient; and a subsidiary ingredient containing alumina and $K_2O$-$MO$—$SiO_2$—$B_2O_3$-based glass, M being selected from the group consisting of Ca and Sr, wherein the weight % ratio of alumina to the main ingredient is from 1.5:100 to 4:100, wherein the weight % ratio of $K_2O$-$MO$—$SiO_2$—$B_2O_3$-based glass to the main ingredient is from 5:100 to 20:100, and wherein the $K_2O$-$MO$—$SiO_2$—$B_2O_3$-based glass has a linear expansion coefficient of $105 \times 10^{-7}/°C$ to $125 \times 10^{-7}/°C$.

2. The dielectric ceramic composition according to claim 1, wherein the $SiO_2$—$K_2O$—$B_2O_3$-based glass has a glass transition point of 480 to 520° C.

3. The dielectric ceramic composition according to claim 1, wherein the $K_2O$-$MO$—$SiO_2$—$B_2O_3$-based glass has a softening point of 580 to 680° C.

4. An electronic element comprising a nonmagnetic layer, wherein the nonmagnetic layer has the dielectric ceramic composition according to claim 1.

5. A multilayer composite electronic element comprising:
a filter portion having a coil conductor and a nonmagnetic layer; and
an exterior portion including the magnetic layer,
wherein the coil conductor contains Ag as a conductive material, and
the nonmagnetic layer has the dielectric ceramic composition according to claim 1.

6. The multilayer composite electronic element according to claim 5, wherein the multilayer composite electronic element is a multilayer common mode filter.

7. The multilayer composite electronic element according to claim 6, further comprising an ESD conductor layer having an electrostatic discharge protection functionality.

* * * * *